(12) United States Patent
Watanabe

(10) Patent No.: US 6,868,453 B1
(45) Date of Patent: Mar. 15, 2005

(54) INTERNET HOME PAGE DATA ACQUISITION METHOD

(75) Inventor: Mitsuhiro Watanabe, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/559,805

(22) Filed: Apr. 26, 2000

(30) Foreign Application Priority Data

Apr. 30, 1999 (JP) .......................................... 11/124132

(51) Int. Cl.[7] .............................................. G06F 15/16
(52) U.S. Cl. ...................... 709/234; 709/217; 709/219
(58) Field of Search .................................. 709/101, 217, 709/219, 234, 229, 227, 206; 707/10; 370/429

(56) References Cited

U.S. PATENT DOCUMENTS

| | | | | |
|---|---|---|---|---|
| 5,931,904 A | * | 8/1999 | Banga et al. ................ | 709/217 |
| 5,961,602 A | * | 10/1999 | Thompson et al. ......... | 709/229 |
| 6,047,356 A | * | 4/2000 | Anderson et al. ........... | 711/129 |
| 6,061,563 A | * | 5/2000 | Lee .......................... | 455/435.1 |
| 6,108,655 A | * | 8/2000 | Schleimer et al. ............ | 707/10 |
| 6,292,825 B1 | * | 9/2001 | Chang et al. ................ | 709/206 |
| 6,324,182 B1 | * | 11/2001 | Burns et al. ................. | 370/429 |
| 6,377,993 B1 | * | 4/2002 | Brandt et al. ............... | 709/227 |
| 6,490,615 B1 | * | 12/2002 | Dias et al. .................. | 709/219 |
| 6,553,412 B1 | * | 4/2003 | Kloba et al. ................ | 709/219 |
| 6,635,324 B1 | * | 10/2003 | Wolf et al. ................ | 428/36.9 |
| 6,721,780 B1 | * | 4/2004 | Kasriel et al. ............. | 709/203 |

FOREIGN PATENT DOCUMENTS

| | | |
|---|---|---|
| JP | 10-021174 | 1/1998 |
| JP | 10-207759 | 8/1998 |
| JP | 10-240604 | 9/1998 |

* cited by examiner

Primary Examiner—William A. Cuchlinski, Jr.
Assistant Examiner—Michael Delgado
(74) Attorney, Agent, or Firm—Scully, Scott, Murphy & Presser

(57) ABSTRACT

In an Internet home page data acquisition method, an access list held by a client is transferred to a cache URL address storage server. Home page data is acquired by a cache server on the basis of the transferred access list. The acquired home page data is transferred from the cache server to the client upon completion of acquisition of the home page data.

11 Claims, 6 Drawing Sheets

INTERNET HOME PAGE DATA ACQUISITION METHOD

BACKGROUND OF THE INVENTION

The present invention relates to an Internet home page data acquisition method of automatically acquiring browsed Internet home page data, i.e., the hypertext data of WWW (World Wide Web) home pages and, more particularly, to an Internet home page acquisition method which can actually shorten the line connection time in a communication path that occupies a telephone or portable phone line.

Conventionally, acquisition of all Internet home page data has been managed on the client side. Cache management has been performed on the server side as well as on the client side. More specifically, home page data accessed in the past are stored in a cache on the server side to reduce the actual amount of access to the WWW server.

As an example of this technique, a method is disclosed in "Data Transfer System" in Japanese Patent Laid-Open No. 10-21174 (reference 1)., which is not limited to a WWW server and designed to suppress an increase in communication time when a client on a LAN (Local Area Network) requests data stored in a data server connected to a WAN (Wide Area Network) and the requested data is transferred. According to reference 1, in response to a data request from the client to the data server, the cache server transfers the requested data to the client if the data is stored in the cache server. If the data is not stored in the cache server, a data request is sent to the data server, and the data is transferred to the client through the cache server.

In an environment in which a user browses data in a WWW server by tracing URLs (Uniform Resource Locators) one by one as in Internet surfing, the method disclosed in "Internet Home Page Management System", Japanese Patent Laid-Open No. 10-240604 (reference 2) has been proposed. According to reference 2, in order to reduce the amount of access to the network, the WWW server transmits only a changed portion of home page data in the WWW server.

As disclosed in "Automatic Hypertext Acquisition Apparatus", Japanese Patent Laid-Open No. 10-207759 (reference 3), a method has been proposed, by which a user can efficiently and automatically acquire effective pages in a small cache area in a portable terminal or the like. In the method disclosed in reference 3, hypertext data are analyzed to trace links to the original hypertext data in accordance with the link tags of the hypertext data so as to store, in a cache, files that are likely to be downloaded, before the user traces the links, thereby shortening the time required for connection to the network.

The following problem is, however, posed in the conventional method of managing acquisition of all Internet home page data on the client side.

A client uses a method of connecting to URL addresses one by one and accepting data. For this reason, if a WWW server in which a target URL exists is congested, the client has difficulty in accessing the WWW server. In this case, the client keeps waiting for acceptance of home page data until a timeout occurs. If, therefore, the number of congested WWW servers increases, much time is required to sequentially download the home page data of all necessary URL addresses. As a consequence, if connection is made through a telephone line or the like, the occupancy of the line undesirably increases.

A similar problem arises in the automatic hypertext acquisition apparatus disclosed in reference 3. According to the method disclosed in reference 3, the occupancy of a line can be decreased as compared with the method of making a user obtain target information by tracing hypertext links. If, however, files are downloaded by the method in reference 3, even files that are not necessary for the user are automatically downloaded into the client, resulting in an increase in traffic on the network. For this reason, the load on the server increases because of the processing performed to shorten the line connection time. This delays a response from the server. As a consequence, the time taken for connection to the network is prolonged.

Furthermore, since the function of transmitting only updated portion of home page data from the WWW server side is lost, the connection time cannot be shortened.

SUMMARY OF THE INVENTION

It is an object of the present invention to provided an Internet home page data acquisition method which can shorten the unnecessary wait time in connecting to a WWW server.

In order to achieve the above object, according to the present invention, there is provided an Internet home page data acquisition method comprising the steps of transferring an access list held by a client to a cache URL address storage server, acquiring home page data by a cache server on the basis of the transferred access list, and transferring the acquired home page data from the cache server to the client upon completion of acquisition of the home page data.

DESCRIPTION OF THE PREFERRED EMBODIMENTS

The present invention will be described in detail below with reference to the accompanying drawings.

[First Embodiment]

Figure 1:
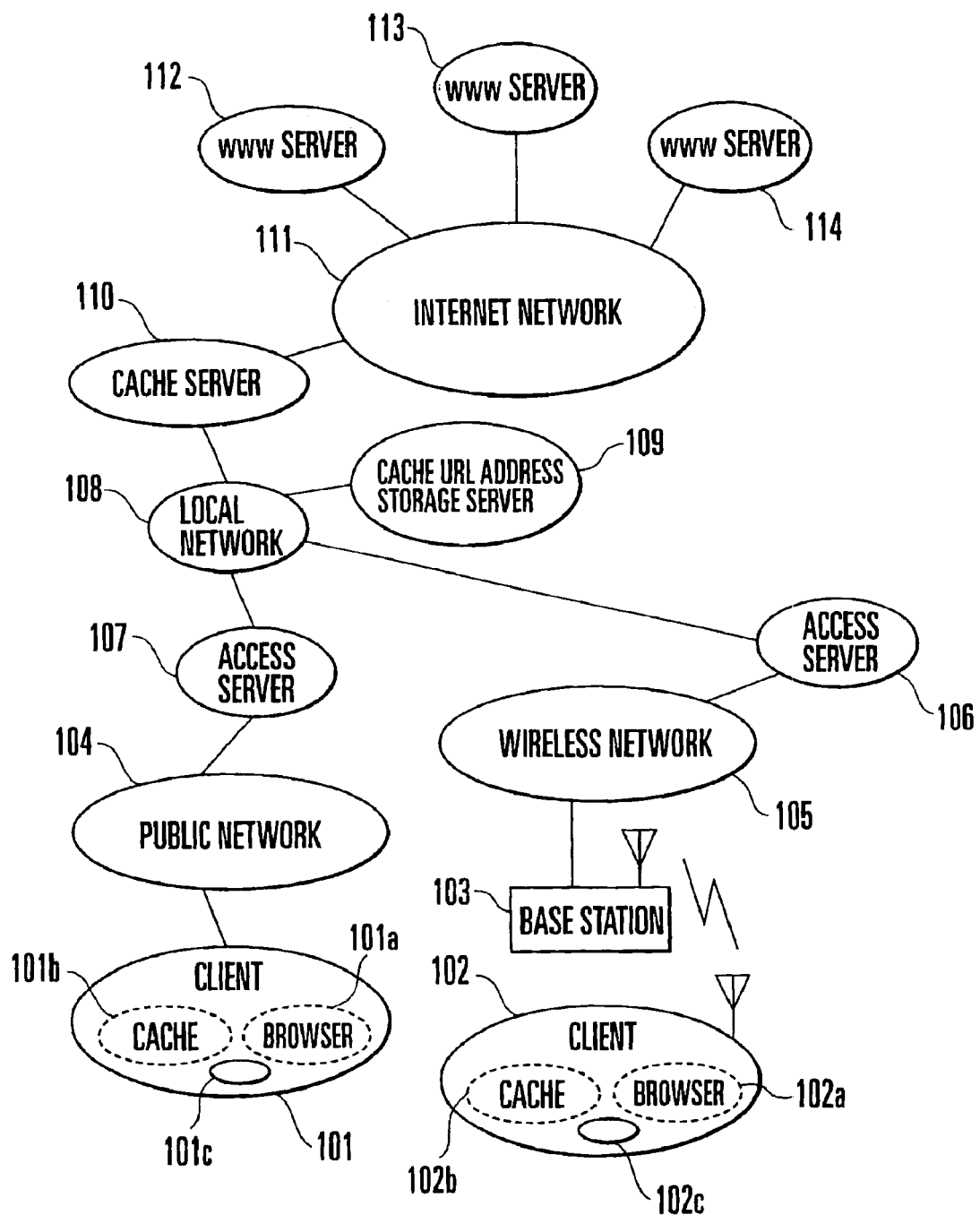
FIG. 1 is a view showing the arrangement of a network system to which an Internet home page data acquisition method according to the first embodiment of the present invention is applied.

FIG. 1 shows the arrangement of a network system to which an Internet home page data acquisition method according to the present invention is applied, and more specifically, an example of a cyclic data acquisition system.

The network system of this embodiment includes a client 101 as a wire client and a client 102 as a wireless client, which browse home page data, a public network 104 to which the client 101 is connected, a base station 103 for performing radio communication with the client 102, a wireless network 105 to which the base station 103 is connected, an access server 107 for connecting only registered users to an Internet network 111 through the public network 104, and an access server 106 for connecting only registered users to the Internet network 111 through the wireless network 105.

This network system also includes a cache URL address storage server 109 for storing and managing the URL addresses (cache URL addresses) of home pages for which cache requests are received from the client 102, a cache server 110 which is connected to the Internet network 111 to retain retrieved home pages, a local network 108 for networking the access servers 107 and 106, cache server 110, and cache URL address storage server 109, and WWW servers 112, 113, and 114 for storing home page data and distributing the hypertext contents of the home pages worldwide through the Internet network 111.

FIG. 1 shows only the three WWW servers 112, 113, and 114 for the sake of descriptive convenience, even through countless WWW serves are connected to the Internet network 111.

In this embodiment, to retain desired home page data in the cache server 110, first of all, the users of the clients 101 and 102 create access lists (cyclic lists) of the URL addresses of home pages which the users want to browse.

These access lists are respectively retained in URL list retention folders in the clients 101 and 102. The respective URL list retention folders have their own attributes. Of these folders, one folder in the client 101 and one folder in the client 102 are defined as server storage cyclic folders 101c and 102c, respectively. These server storage cyclic folders 101c and 102c are used to retain access lists (cyclic lists) of URL addresses from which the users want to collectively cache data.

Browsers 101a and 102a in the clients 101 and 102 create list data conforming to the format of the cache URL address storage server 109 on the basis of the access lists retained in the server storage cyclic folders 101c and 102c. The browsers 101a and 102a of the clients 101 and 102 transfer the created access lists of cache URL addresses to the cache URL address storage server 109 at the time of line connection, and then disconnect the lines.

The cache server 110 searches for home pages on the basis of the access lists transferred to the cache URL address storage server 109, and sequentially retains home page data upon finding the target URL addresses. When all the home page data are retained, the cache server 110 connects lines to the clients 101 and 102 and issues data acceptance requests to the clients 101 and 102. Upon reception of the data acceptance requests, the clients 101 and 102 accept the home page data from the cache server 110 and retain them in caches 101b and 102b.

According to another method, the clients 101 and 102 periodically check the retained state of cache data in the cache server 110, and accept only cached data. In this case, on the basis of periods of time required for the acquisition of home page data and the like, the cache server 110 notifies the clients 101 and 102 of the times at which data should be accepted. This makes it possible to avoid an unnecessary increase in traffic on the network.

The cache server 110 also caches home page data in accordance with requests from the clients 101 and 102. If, therefore, the cache server 110 retains all the home page data requested by the clients 101 and 102 for the same period of time, the memory of the cache server 110 will be wasted.

In order to solve this problem, different data retention times are set in accordance with the numbers of accesses to the respective home pages. In this case, the data of home pages to which larger numbers of accesses are made are retained for longer times. With regard to home pages which are accessed little, the data are discarded when the clients 101 and 102 accept them. This makes it possible to further reduce the traffic on the network.

According to this embodiment, the clients 101 and 102 send access lists of URL addresses of home pages, from which the clients want to accept data, to the cache URL address storage server 109, and the home page data are acquired by the cache server 110, which is always connected to the network, and transferred to the clients 101 and 102. With this operation, the home page data can be acquired in short connection times.

In addition, it suffices if access lists (cyclic lists) of URL addresses to be circulated are stored in folders, in the clients 101 and 102, to which a special meaning like "dedicated to circulation" is assigned. The access lists in the folders are transferred to the cache URL address storage server 109 at the time of line connection. The cache server 110 then acquires home page data on the basis of the transferred access lists. This makes it possible to shorten the wait time in home page address search operation and the line connection time.

[Second Embodiment]

Figure 2:
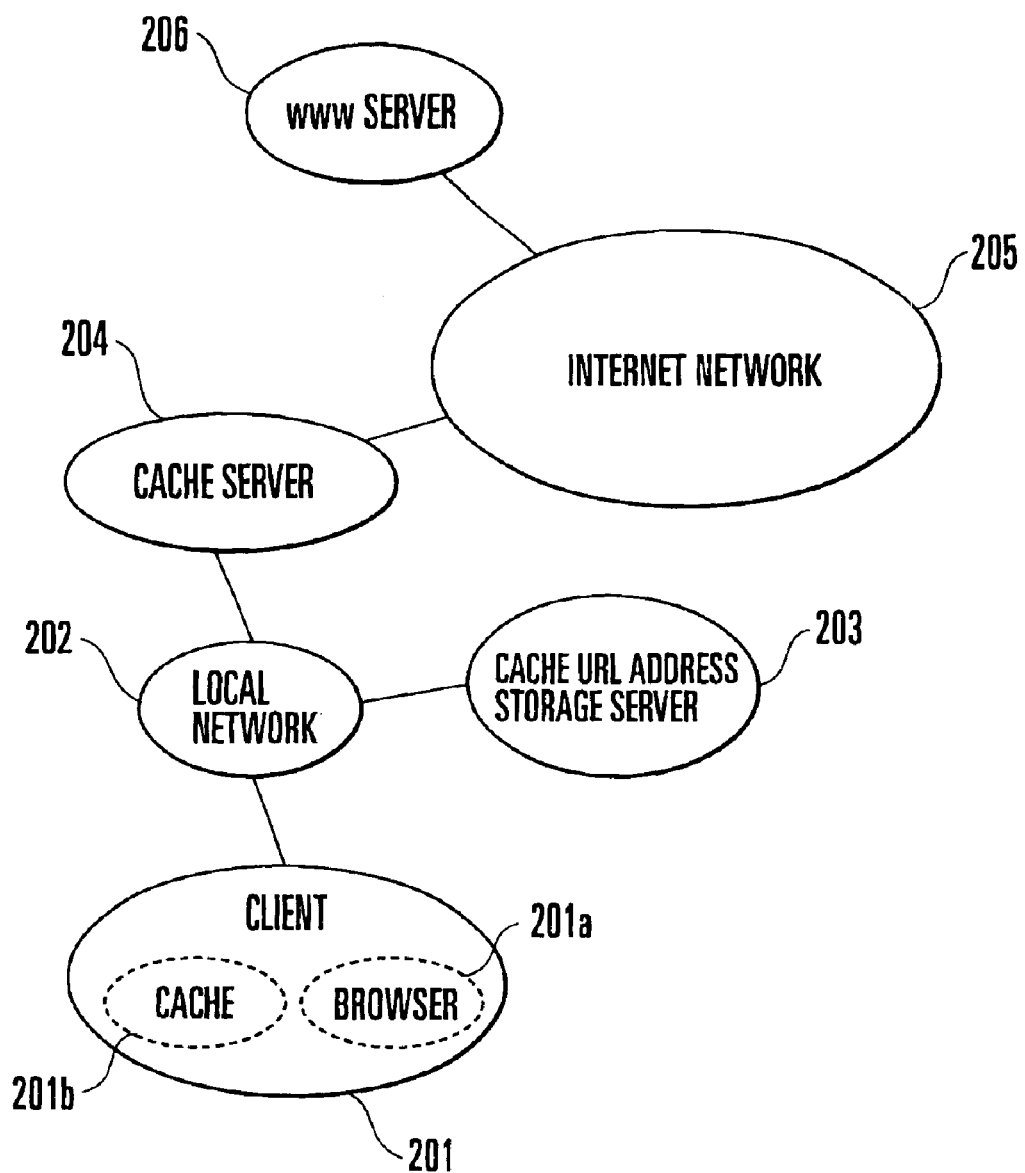
FIG. 2 is a view showing the arrangement of a network system to which an Internet home page data acquisition method according to the second embodiment of the present invention is applied.

Referring to FIG. 2, reference numeral 201 denotes a client including a browser 201a for browsing home page data and a cache 201b; 202, a local network to which the client 201 is connected; 203, a cache URL address storage server connected to the local network 202; 204, a cache server connected to the local network 202; 205, an Internet network to which the cache server 204 is connected; and 206, a WWW server connected to the Internet network 205.

The cache URL address storage server 203 causes the cache server 204 to acquire home page data from the WWW server 206 on the basis of an access list (cyclic list) of cache URL addresses transferred from the client 201.

Figure 3:
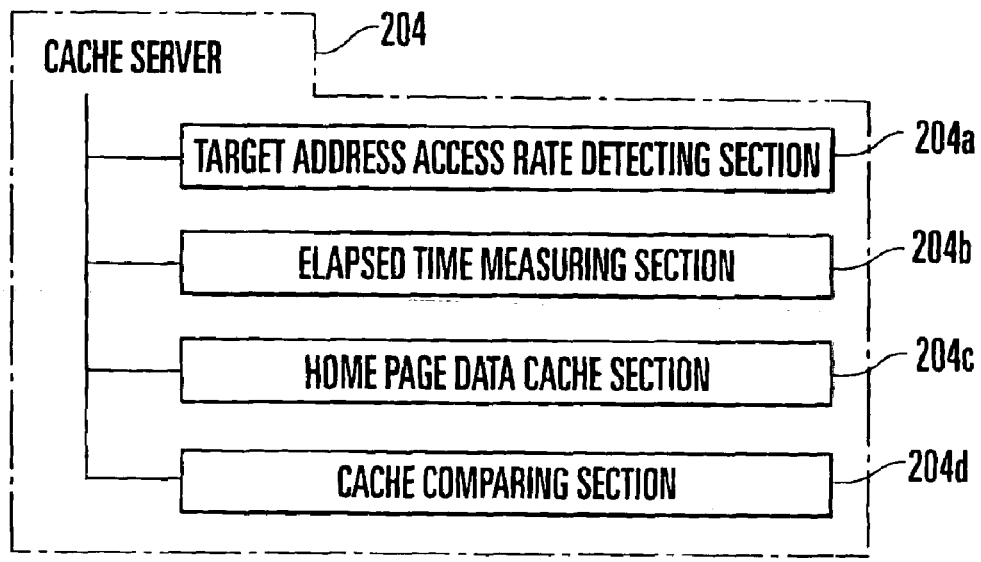
FIG. 3 is a block diagram showing the internal arrangement of a cache server in FIG. 2.

As shown in FIG. 3, the cache server 204 includes a target address access rate detecting section 204a for checking the access state of URL addresses to be circulated, an elapsed time measuring section 204b for measuring the retention time of cache data, a home page data cache section 204c for storing acquired home page data, and a cache comparing section 204d for making a comparison to check whether the cached data is the latest data.

Figure 4:
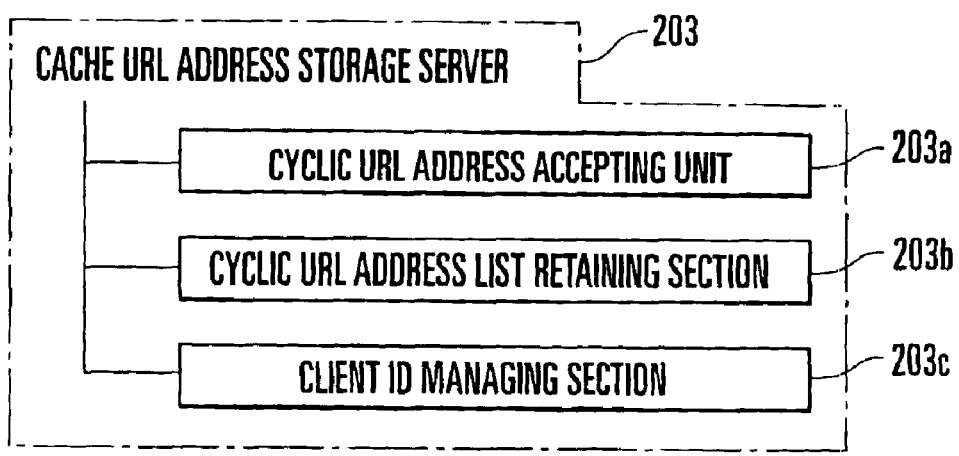
FIG. 4 is a block diagram showing the internal arrangement of a cache URL address storage server in FIG. 2.

As shown in FIG. 4, the cache URL address storage server 203 includes a cyclic URL address accepting unit 203a for accepting cache URL addresses (cyclic URL addresses) requested by a client, a cyclic URL address list retaining section 203b for retaining an accepted access list (cyclic URL address list) of cache URL addresses for each client, and a client ID managing section 203c for checking the ID of each client managing information for ensuring an area for caching data for each client, and managing a data acceptance requesting method for each client.

Figure 5:
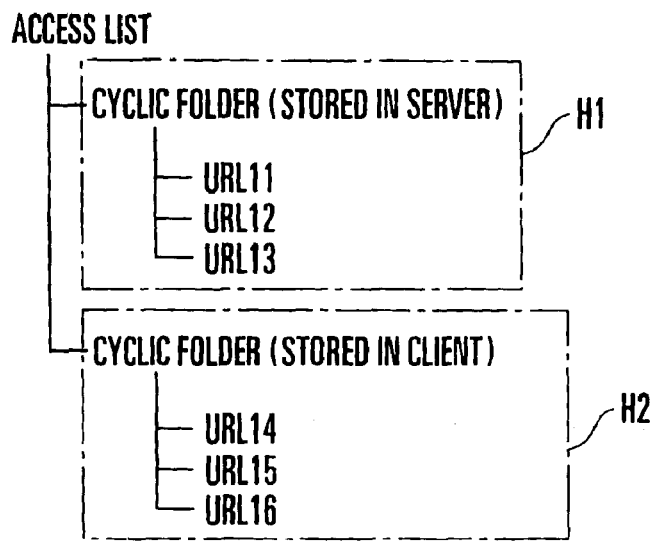
FIG. 5 is a view showing a folder structure for managing an access list on the client side.

An access list of cache URL addresses transferred from the client 201 to the cache URL address storage server 203 is managed in units of folders. FIG. 5 shows the folder structure of an access list.

As shown in FIG. 5, the access list of URL addresses is managed by dividing a folder into a server storage cyclic folder H1 and client storage cyclic folder H2. The access list stored in the server storage cyclic folder H1 is transferred as an access list (cyclic list) of cache URL addresses to the cache URL address storage server 203. For the sake of descriptive convenience, two folders are used in this case, although the number of folders is not limited.

When the cache server 204 is to be caused to actually perform circulation, the address information of the corresponding URL addresses is copied to the server storage cyclic folder H1. When the client 201 is to be caused to actually perform circulation, the address information of the corresponding URL addresses is copied to the client storage cyclic folder H2.

At the time of line connection, the client 201 transfers the address information of "URL11", "URL12", and "URL13" stored in the server storage cyclic folder H1 to the cache URL address storage server 203. Upon reception of this information, the cache URL address storage server 203 prepares for the acquisition of information.

Figure 6:
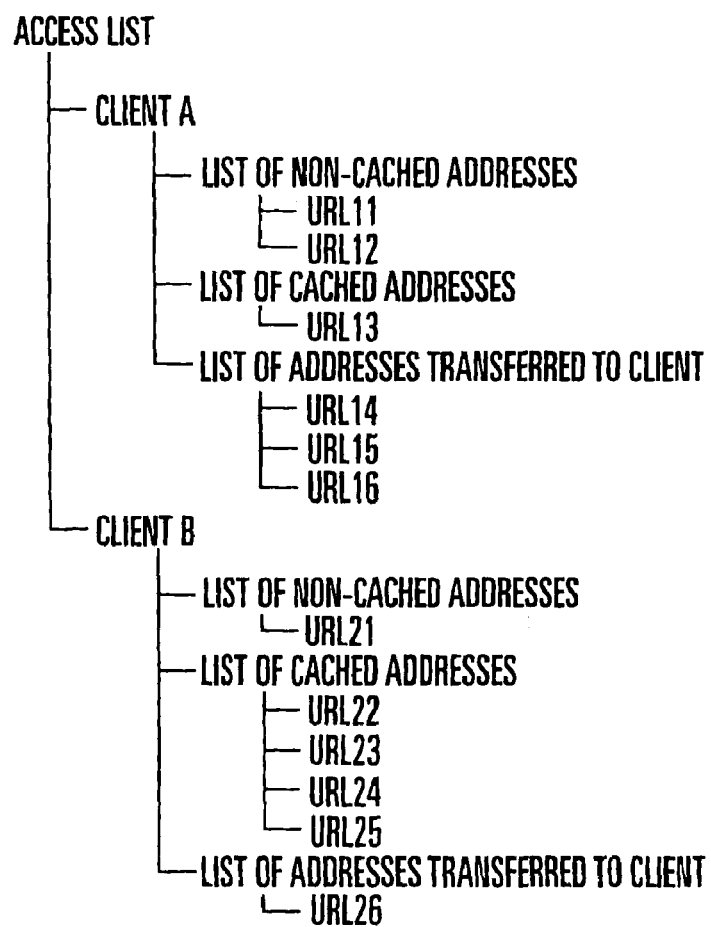
FIG. 6 is a view showing management information on the cache URL address storage server side.

FIG. 6 shows management information (access list) in the cache URL address storage server 203. The cache URL address storage server 203 manages a cache state for each client.

Referring to FIG. 2, the Internet network 205 and WWW server 206 are known well by the person skilled in the art, and hence a description of the detailed arrangements will be omitted.

Figure 7:
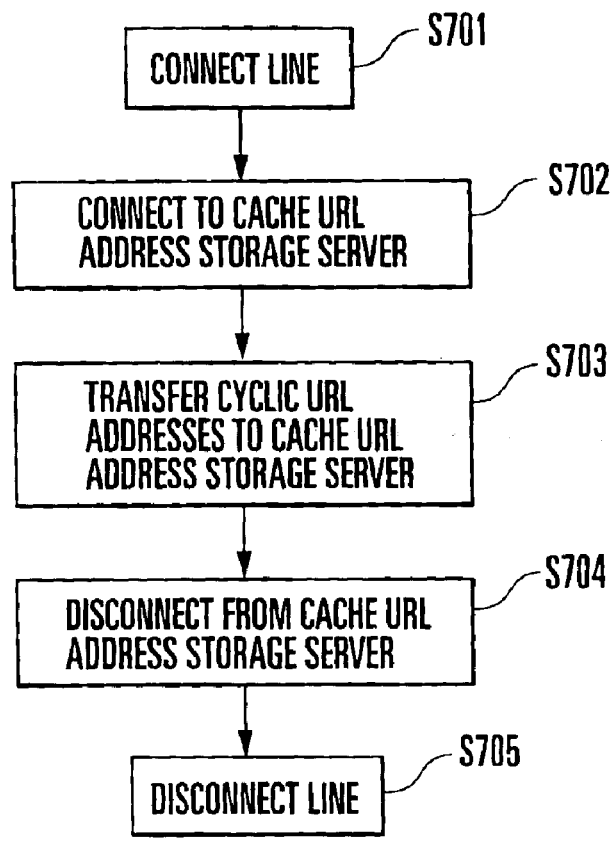
FIG. 7 is a flow chart for explaining the operation of the network system in FIG. 2.

The operation of the above network system will be described next with reference to the flow chart of FIG. 7.

At the time of line connection (step S701), the client 201 connects to the cache URL address storage server 203 (step S702). After connection to the cache URL address storage server 203, the client 201 extracts cache URL addresses to be circulated from the server storage cyclic folder H1, and transfers them to the cache URL address storage server 203 (step S703).

Upon completion of the transfer of the URL addresses, the client 201 temporarily disconnects from the cache URL address storage server 203 (step S704), and disconnects the line (step S705). The cache server 204 acquires and caches home page data from home pages at the target URL addresses through the Internet network 205 on the basis of the access list of cache URL addresses stored in the cache URL address storage server 203.

Obviously, data having the same date and size as those of data existing in the cache server 204 are regarded as identical data and hence are not acquired from the WWW server 206, and only new data are stored.

If, however, all the data of accessed home pages are stored, a shortage of memory capacity occurs. For this reason, the retention time of cache data is changed in accordance with the access rate of each home page.

The retention period of the data of a home page with a high access rate is set be longer than that of the data of a home page with a low access rate. This makes it possible to efficiently cache data. Note that the access rate of each home page may be calculated on the basis of the frequency of occurrence of URLs with which the client 201 requests the acquisition of data.

According to this embodiment, the cache server 204 that is always connected to the Internet has the data acquisition function, and the client 201 requests the cache server 204 through the cache URL address storage server 203 to acquire home page data. When all home page data are acquired, the client 201 accepts the data from the cache server 204. With this operation, the wait time in accessing the WWW server can be shortened, thus shortening the connection time of a telephone line or the like.

In addition, a folder in the client 201 is assigned a special meaning like "dedicated to circulation", and operation is performed according to the meaning assigned to the folder at the time of line connection, thereby easily setting URL addresses to be circulated.

[Third Embodiment]

Figure 8:
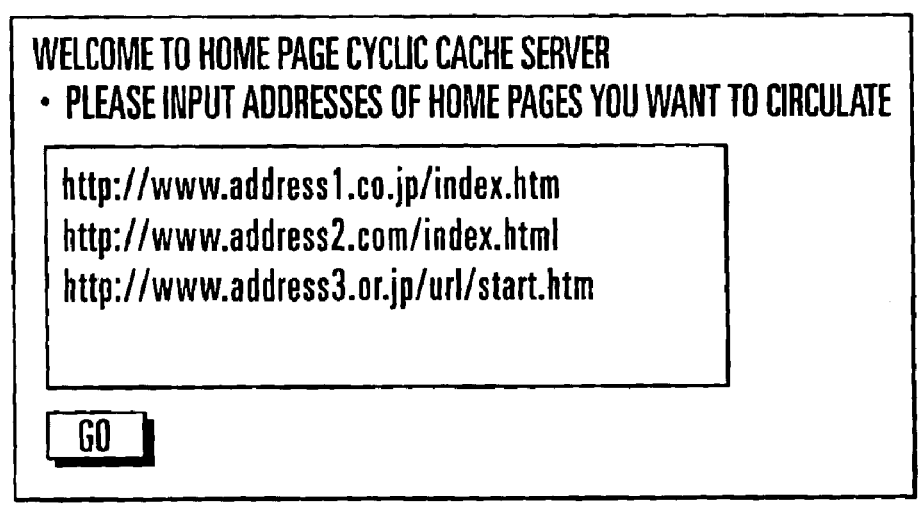
FIG. 8 is a view showing an Internet window to explain how URL addresses are set from a WWW home page according to the third embodiment of the present invention.

In the third embodiment, a further improvement is made on the method of transferring URL addresses to a cache URL address storage server 203. More specifically, as shown in FIG. 8, the message "Please input the addresses of home pages that you want to circulate" is displayed on an Internet window on a client 201 to allow the user to set URL addresses on a WWW home page. Note that the basic arrangement of the third embodiment is the same as that of the second embodiment, and hence a description thereof will be omitted.

According to this embodiment, by setting URLs on the home page, the user can set URL addresses by using a general WWW browser without requiring dedicated software for sending cache URL addresses to the cache URL address storage server 203. Note that the method of accepting stored URL data is the same as that used in the second embodiment.

[Fourth Embodiment]

Figure 9:
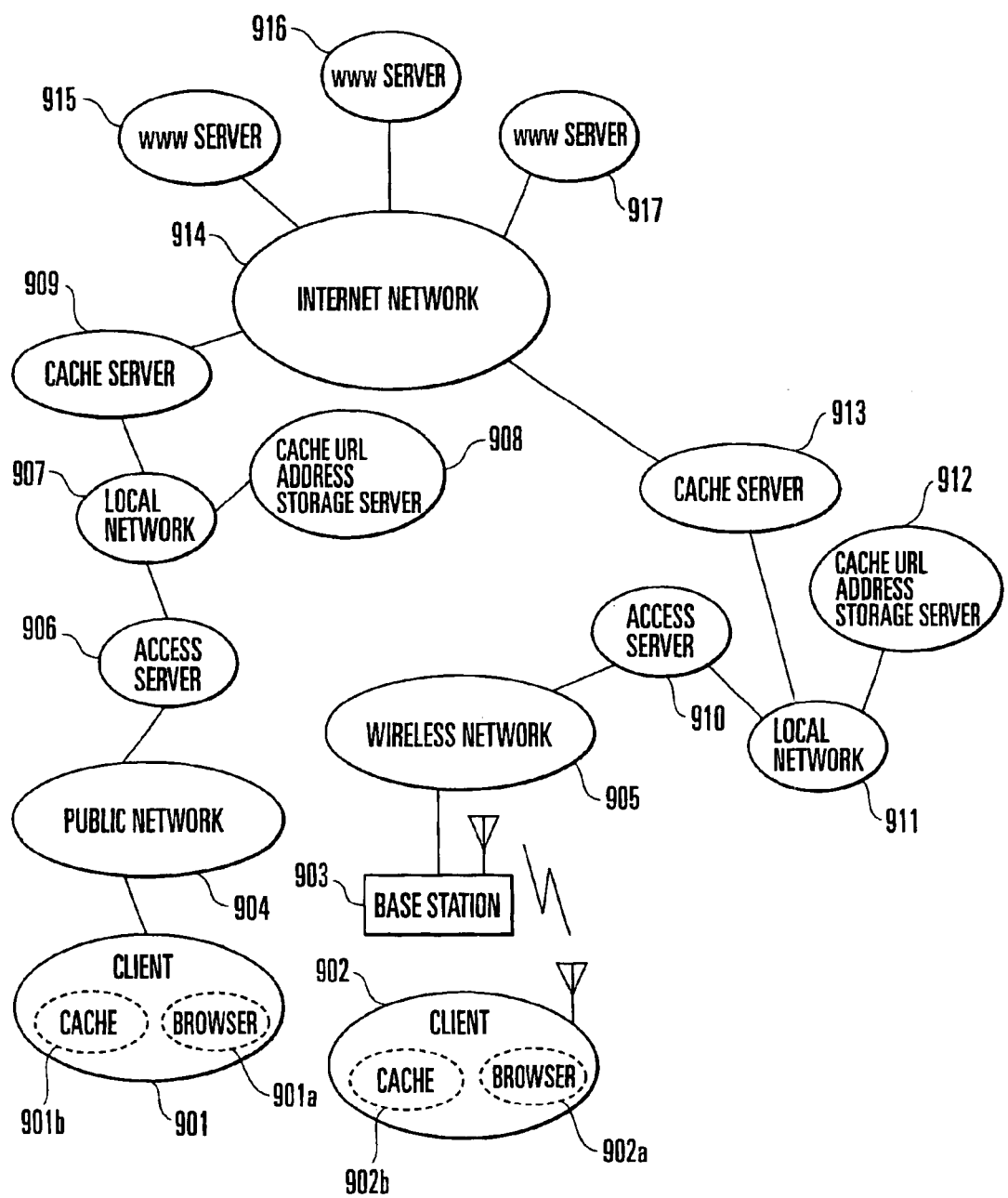
FIG. 9 is a view showing the arrangement of a network system to which an Internet home page acquisition method according to the fourth embodiment of the present invention is applied.

FIG. 9 shows still another embodiment associated with the connection state of clients and cache servers. As shown in FIG. 9, a public network 904 and wireless network 905 respectively have cache servers 909 and 913 separately connected to an Internet network 914. This arrangement makes it possible to transfer data to clients 901 and 902 by methods suitable for the respective networks.

In some case, for example, the client 902 designed to perform radio communication may have difficulty in accepting data depending on the state of a radio channel between the client and a disk unit 903. For this reason, data reduction and the like are executed in the cache server 913. This allows the client 902 to accept data in a shorter period of time than in accessing through the public network 904. In this manner, a data transfer method can be optimized in accordance with a network environment.

Reference numerals 901a and 902a denote browsers; 901b and 902b, caches; 906 and 910, access servers; 907 and 911, local networks; 908 and 912, cache URL address storage servers; and 915, 916, and 917, WWW servers.

As has been described above, according to the present invention, since a cache server that is always connected to the network is made to acquire home page data, the home page data can be acquired in a short connection time. This can shorten the unnecessary wait time when a client connects to a WWW server.

In addition, since an access list to be transferred to a cache URL address storage server is retained in a server storage cyclic folder in a client, the data to be transferred to the cache URL address storage server are specified. This makes it possible to facilitate circulation.

What is claimed is:

1. An Internet home page data acquisition method in a network system comprising:

a client device acquiring and displaying home page data, a cache URL address storage server storing an access list of a URL address transferred from the client device as a cyclic list, a cache server acquiring and temporarily storing the home page data on the basis of the cyclic list stored in the cache URL address storage server, and a cache server for collecting home page data on the basis of the cyclic list stored in the cache URL address storage server to store temporarily the home page data, the method comprising the steps of:

providing the client device with a server storage cyclic folder and a client storage cyclic folder;

storing an access list of a URL address which requests to leave a cycle to the cache server in the server storage cyclic folder of the client device;

transferring the access list held in the server storage cyclic folder of the client device to the cache URL address storage server as the cyclic list;

acquiring home page data by the cache server on the basis of the cyclic list transferred to the cache URL address storage server; and making the client device pick up the home page data collected by said cache server, the client device collecting the home page data on the basis of the access list stored in the client storage cyclic folder of the client device.

2. A method according to claim 1, wherein said client includes a server storage cyclic folder for storing an access list to be transferred to said cache URL address storage server, and the step of transferring the access list comprises transferring the access list retained in said server storage cyclic folder to said cache URL address storage server.

3. A method according to claim 1, wherein the step of transferring the home page data comprises the steps of:

causing said cache server to connect a line to said client when acquisition of home page data is completed; and transferring the acquired home page data from said cache server to said client after the line is connected.

4. A method according to claim 1, wherein the step of transferring the home page data comprises the steps of:

causing said client to connect a line to said cache server when acquisition of home page data is completed; and transferring the acquired home page data from said cache server to said client after the line is connected.

5. A method according to claim 4, wherein the step of connecting the line comprises the step of periodically connecting the line to said cache server.

6. A method according to claim 4, wherein the method further comprises the step of causing said cache server to notify said client of an acquisition end time when the access list is transferred, and the step of connecting the line comprises the step of connecting the line to said cache server at the notified acquisition end time.

7. A method for acquiring an Internet home page, the method comprising:

connecting a line between a client and a cache URL address storage server;

transferring an access list from the client to the cache URL address storage server, the access list comprising URL addresses that the client wishes to receive;

disconnecting the line between the client and the cache URL address storage server;

acquiring home page data at a cache server on the basis of the URL addresses in the transferred access list;

connecting a line between the client and the cache server upon completing the acquisition of the home page data; and transferring the acquired home page data from the cache server to the client, wherein the client includes a server storage cyclic folder for storing an access list to be transferred to the cache URL address storage server, and the step of transferring the access list comprises transferring the access list retained in the server storage cyclic folder to the cache URL address storage server.

8. The method according to claim 7, wherein the cache server connects the line to the client when acquisition of home page data is completed.

9. The method according to claim 1, wherein the client connects the line to the cache server when acquisition of home page data is completed.

10. The method according to claim 9, wherein the step of connecting the line comprises the step of periodically connecting the line to the cache server.

11. A method according to claim 9, wherein the method further comprises the steps of:

causing the cache server to notify the client of an acquisition end time when the access list is transferred, and the step of connecting the line comprises the step of connecting the line to the cache server at the notified acquisition end time.

* * * * *